Patented Sept. 29, 1942

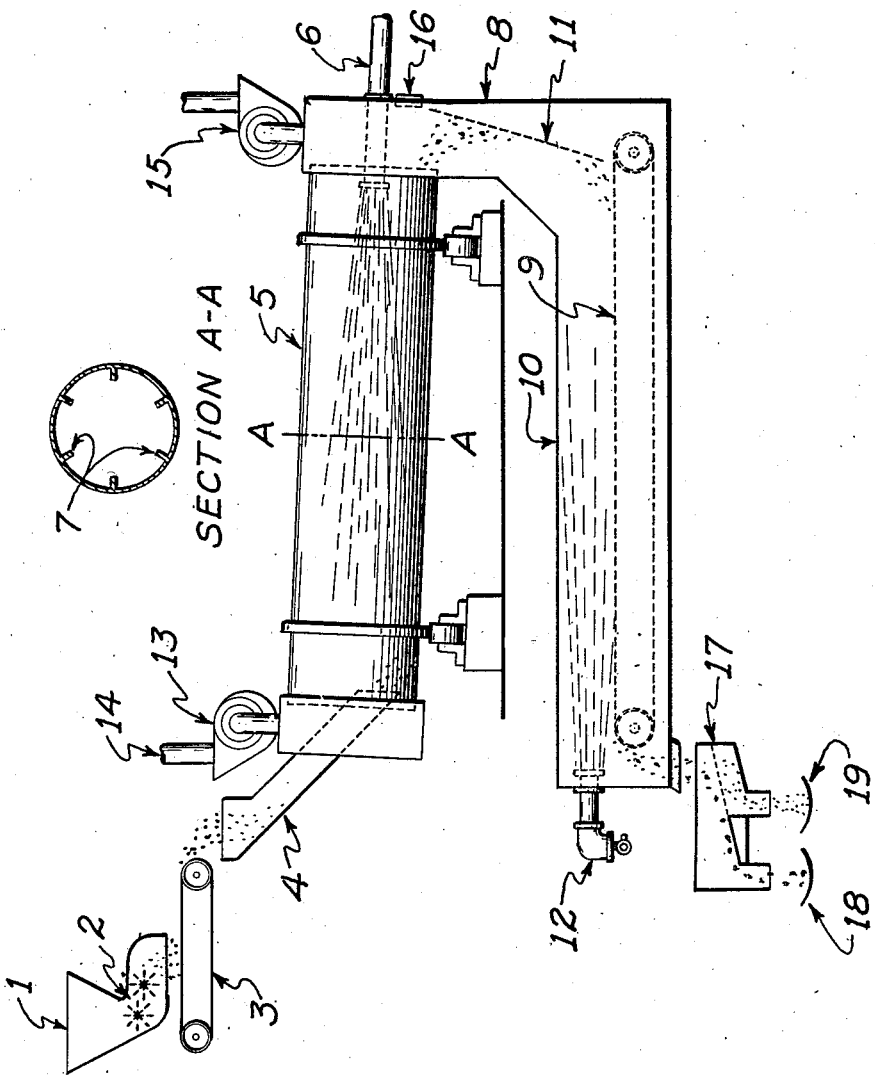

UNITED STATES PATENT OFFICE 2,297,300

PROCESS FOR THE GRANULATION OF CRYSTALLINE MATERIALS

John O. Hardesty, Arlington, Va., and William H. Ross, Washington, D. C., assignors to Claude R. Wickard, as Secretary of Agriculture of the United States of America, and to his successors in office Application January 31, 1941, Serial No. 376,826

1 Claim. (Cl. 23—89)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a process for improving the physical condition of finely-divided crystalline materials such as commercial potassium chloride.

One of the objects of our invention is to provide a method for improving the drillability and reducing the caking tendency of finely-divided crystalline materials, and particularly of fertilizer materials.

Another object of our invention is to provide a continuous method for the treatment of finely-divided crystalline materials whereby they are produced in the form of spherical granules of predetermined structure and of substantially uniform size.

Still another object of our invention is to provide a method for controlling the size, apparent density, and degree of hardness of the granules.

Many processes are now in use, or have been proposed, for the granulation of fertilizer materials and mixtures. Easily fusible materials can be granulated very conveniently by spraying a melt of the material into a cooling tower, and a number of fertilizer materials, such as urea and sodium nitrate, are now being granulated in this way. Materials, such as superphosphate, and ordinary fertilizer mixtures cannot be fused without decomposition and the principal method heretofore used for granulating fertilizers of these types is one that involves the subsequent drying in a rotary dryer of the granules obtained by rolling or tumbling the moist material in a rotating drum or other device. This method of granulation is commonly referred to as one of rotary drying.

Granulation by the method of rotary drying takes place when two or more particles of a material, or mixture of materials, stick together with sufficient tenacity to withstand the rolling or tumbling action to which the resulting larger particles or granules are subjected in the course of their formation. Granulation by this method can only occur therefore in materials that exhibit some plastic properties. Certain fertilizers, such as superphosphate and superphosphate mixtures, are particularly amenable to granulation by this method. They not only granulate very readily but the plasticity of the granules is such that they remain intact when subjected to the agitation incident to drying in a rotary dryer.

Finely-divided crystalline salts, such as potassium chloride, ammonium sulfate and urea are sufficiently plastic when moist to undergo granulation, but the plasticity of freshly-formed granules of materials of this kind decreases as their moisture content is decreased with the result that they are again reduced to a powder when an attempt is made to dry the granules in a rotary dryer. The adaption of the method of rotary drying to the granulation of finely-divided crystalline salts has therefore been deemed impractical heretofore owing to the tendency of the granules to undergo rapid disintegration during the rotary drying process.

We have found that the liquid phase of moist finely-divided crystalline salts, such as potassium chloride, is surprisingly sensitive to the temperatures between 60° and 100° C., and that with a predetermined amount of liquid phase there is a certain definite temperature within this range at which the liquid phase is sufficiently viscous to hold the fine particles together in the form of granules during their formation in the moist condition. When the moisture content of the granules is decreased, however, as in the process of drying, the plasticity of the granules is then no longer sufficient to hold the granules together when subjected to the rolling and cascading action of a rotary dryer.

We have further found that the disintegration of the moist granules is inhibited during the drying process by drying the granules in a dryer of the continuous tunnel type.

We have further found that the use of tunnel drying in the final stages of drying the granules permits a knitting together of the crystals that are deposited from the solution phase, thereby resulting in the formation of a product possessing granules of sufficient density and hardness to withstand any treatment to which normally would be subjected under commercial conditions of handling and storage.

This treatment of materials whereby they are changed from a finely-divided to a granular condition offers the advantages in the case of fertilizers that it reduces caking; prevents segregation; improves their drillability; decreases handling and bagging charges; and prevents losses by dusting when the material is distributed in the field on a windy day.

For a better understanding of our invention reference is made to the accompanying drawing, which forms a part of this application, and which is a side elevation of one form of apparatus for practicing our invention, without limiting the invention to the particular construction and arrangement or combination of parts shown therein.

A moist finely-divided crystalline salt such as that recovered from its mother liquor as in ordinary commercial practice is delivered by any suitable means, not shown, into hopper 1, whence it is discharged, if caked, into a suitable disintegrating device 2, for breaking up lumps of the fine moist material. A suitable conveyor 3, carries the finely-divided material to a chute 4, discharging into a rotary granulating cylinder 5, operated by any suitable means, not shown, and provided with a burner 6, for supplying a controlled amount of heat by the combustion of oil or other fuel. Fins 7, adapted to extend the entire length of cylinder 5, are equally spaced around its inner circumference, and facilitate the rolling and tumbling of the finely-divided material while it is being heated in a substantially non-drying atmosphere, thereby increasing the fluidity of the solution phase and bringing about cohesion of the particles. Fins 7, are of such height that only a mild cascading action is imparted to the particles of material.

The resulting moist granules of substantially uniform size and shape are discharged from granulating cylinder 5, through housing 8, onto conveyor belt 9, of a tunnel dryer 10. As the moist granules are discharged from granulating cylinder 5, they are directed by deflector 11, onto conveyor 9, in tunnel dryer 10, in which they are dried by a counter-current flow of hot gases from an oil or gas burner 12. The hot, moist gases from tunnel dryer 10, are permitted to pass through housing 8, thence, in whole or in part, through granulating cylinder 5, and are discharged into the atmosphere through exhaust fan 13, and pipe 14. The proportion of the gas from tunnel dryer 10, that is passed through granulating cylinder 5, can be controlled, if necessary, by means of auxiliary exhaust fan 15. Thus, means are provided whereby the atmosphere in granulating cylinder 5, can be maintained in a substantially non-drying condition while at an elevated temperature. Observations of the material passing through granulating cylinder 5, may be made through window 16.

The dried granular material, as it is discharged from tunnel dryer 10, is allowed to fall on vibratory screen 17. The oversize from screen 17, is transferred by means of the conveyor 18, to suitable crushing and screening equipment, not shown, in which it is milled to give the maximum proportion of granular material of the desired size, while the fines are returned to hopper 1. The remainder of the dry granular material discharged from screen 17, is transferred by conveyor 19, to the storage bin, not shown, together with the regular size of granular material recovered from the screening and crushing equipment.

We have found that the efficiency with which a material granulates is dependent upon its temperature and the amount of liquid phase present. The size and structure of the granules may, therefore, be controlled by adjusting the temperature of the gases passing through granulating cylinder 5, and/or the initial moisture content of the material. We have found that the temperature of the material should be optimum for granulation when the material has progressed about three-fourths of the distance through granulating cylinder 5. The cascading action to which the newly-formed granules are subjected in their passage through the remaining portion of granulating cylinder 5 increases the hardness of the granules, but the time to which they are exposed to this rolling action in the lower part of this granulator is insufficient to permit a further agglomeration of the granules into larger aggregates. This control in our process produces a uniform product, which is not obtained when the granules are formed at an earlier stage in the passage of the material through granulating cylinder 5.

The granulation of moist materials by agitation and drying in a rotary dryer is an old art, and gives satisfactory results in the treatment of certain materials as already explained, but is not adapted to the granulation of many crystalline materials, such as potassium chloride. Our process, as described herein, is a means for the efficient production of granules of materials of this type that are uniform in size and shape, which it has not been possible to obtain by the methods taught in the prior art.

A preferred method of performing our invention is illustrated by the following example:

*Example*

Commercial potassium chloride, of which 87.7 percent passed a 200-mesh screen and which contained 11.1 percent moisture, was granulated by the above-described method at a temperature of 60° C., and dried in a tunnel dryer at temperatures that ranged up to 400° C. No appreciable disintegration of the granules occurred during the process of drying under these conditions at any of the temperatures used in the tests. All of the resulting dried product was in granular form, 81.3 percent of which was 5–30 mesh in size.

These granules had an average crushing strength of 82 pounds per square inch. This demonstrates the importance of terminating the agitation of the material at a stage in the process when the granules are well formed and still contain sufficient liquid phase to insure their stability.

While the above illustration pertains only to potassium chloride, it will be understood that it applies equally well to other crystalline materials, such as, for example, urea, sodium sulfate, ammonium sulfate and sodium carbonate, which in a moist state exhibit the same tendency to agglomerate in a granulating cylinder, but which tend to be reduced again to a powder when subjected to continued agitation in the process of drying.

Having thus described our invention, what we claim for Letters Patent is:

A continuous process for granulating finely-divided potassium chloride, which comprises adjusting potassium chloride to a moisture content of 10–12 percent, thence subjecting the moist potassium chloride to a rolling and cascading action in a rotating cylindrical drum in the presence of a non-drying atmosphere, the while heating the potassium chloride to such a temperature between 60° C. and 100° C. as will engender a fluidity of the liquid phase to cause agglomeration of the fine particles into granules of a predetermined size, thence allowing a continuous flow of the resulting moist granular material to fall on the moving belt of a tunnel dryer, and drying the granules at a temperature of 200°–400° C. by a counter-current flow of hot air.

JOHN O. HARDESTY.
WILLIAM H. ROSS.